(12) United States Patent
Fein et al.

(10) Patent No.: US 7,818,097 B2
(45) Date of Patent: Oct. 19, 2010

(54) VEHICLE CONTROL INTERFACE

(76) Inventors: Gene Fein, 760 East St., Lenox, MA (US) 01240; Edward Merritt, 139 Lime Kiln Rd., Lenox, MA (US) 01240

( * ) Notice: Subject to any disclaimer, the term of this patent is extended or adjusted under 35 U.S.C. 154(b) by 1095 days.

(21) Appl. No.: 11/464,119

(22) Filed: Aug. 11, 2006

(65) Prior Publication Data
US 2008/0039998 A1    Feb. 14, 2008

(51) Int. Cl.
*G06F 17/00*    (2006.01)
*G06F 7/00*     (2006.01)

(52) U.S. Cl. .......................................... 701/1
(58) Field of Classification Search .................. 701/1–2, 701/36
See application file for complete search history.

(56) References Cited

U.S. PATENT DOCUMENTS 6,389,337 B1 * 5/2002 Kolls ............................ 701/29
6,505,780 B1   1/2003 Yassin et al.
6,641,037 B2 * 11/2003 Williams ...................... 235/383

FOREIGN PATENT DOCUMENTS

| DE | 19650048 A1 | 6/1998 |
| DE | 102004006734 A1 | 9/2005 |
| DE | 102005026849 A1 | 12/2006 |
| GB | 2336221 | 10/1999 |
| WO | 2006/058583 A | 6/2006 |

OTHER PUBLICATIONS

The International Bureau of WIPO; PCT/US2007/075413, filed Aug. 7, 2007; International Preliminary Report on Patentability; 9 Pages.

* cited by examiner

*Primary Examiner*—Yonel Beaulieu
(74) *Attorney, Agent, or Firm*—Stolowitz Ford Cowger LLP

(57) ABSTRACT

Briefly, in accordance with one or more embodiments, one or more vehicle system nay be transferred via a control unit and/or an order confirmation may be communicated via the control unit.

44 Claims, 6 Drawing Sheets

VEHICLE CONTROL INTERFACE

BACKGROUND

Automobiles occasionally may have certain remote control features such as seat settings, media settings, driving directions and maintenance alerts. Currently, some models exist that carry out some of these functions in various forms. Currently, for families with cars driven by multiple drivers or for the rental car industry, these preordained settings are often locked in place or cumbersome and time consuming to adjust.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
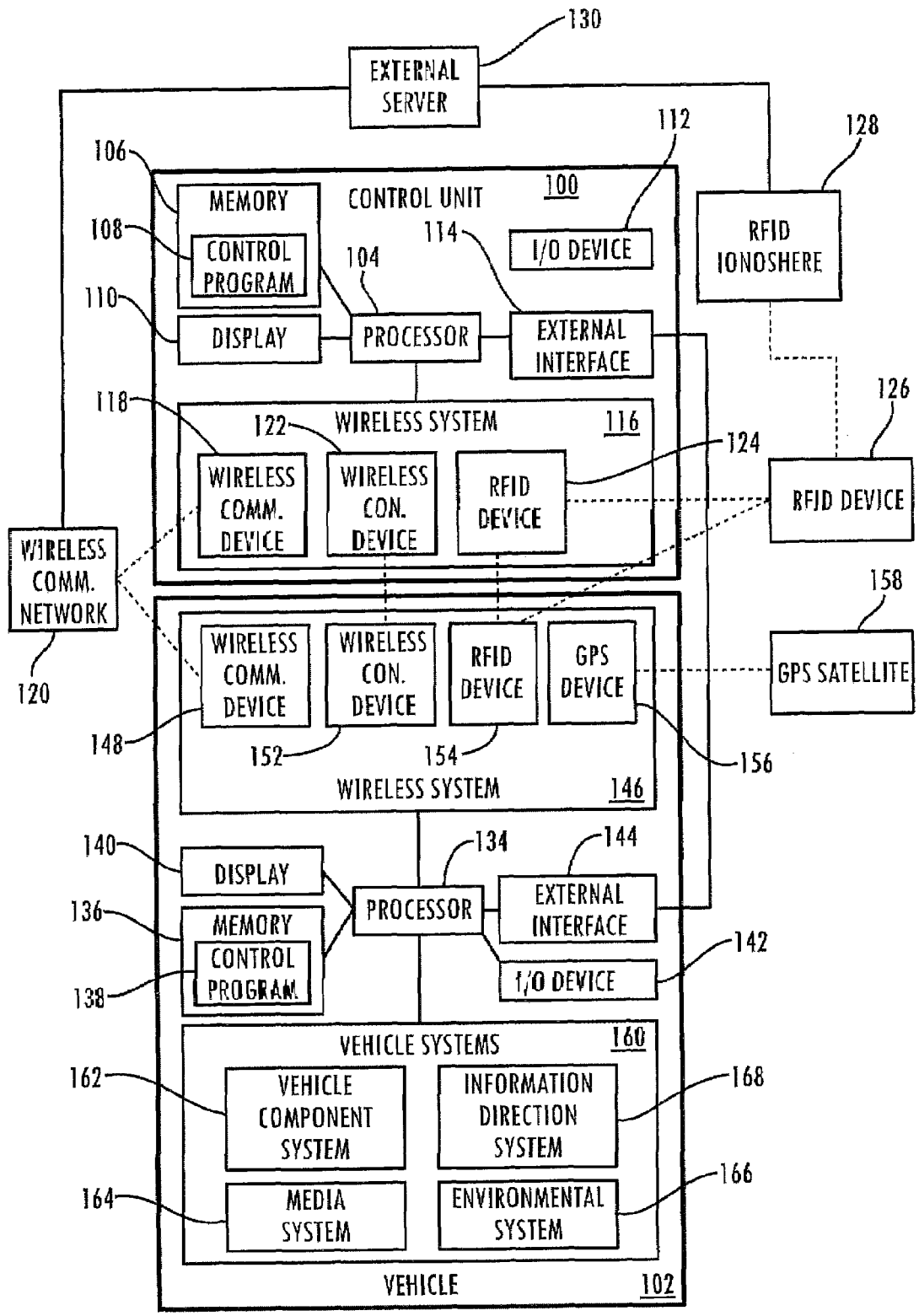
FIG. 1 is a block diagram of a vehicle and a control unit in accordance with one or more embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of the claimed subject matter. It should also be noted that directions and references, for example, up, down, top, bottom, and so on, may be used to facilitate the discussion of the drawings and are not intended to restrict the application of the claimed subject matter. Therefore, the following detailed description is not to be taken in a limiting sense and the scope of the claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follow are presented in terms of algorithms, programs and/or symbolic representations of operations on data bits or binary digital signals within a computer memory, for example. These algorithmic descriptions and/or representations may include techniques used in the data processing arts to transfer the arrangement of a computer system and/or other information handling system to operate according to such programs, algorithms, and/or symbolic representations of operations.

A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Embodiments claimed may include one or more apparatuses for performing the operations herein. These apparatuses may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used to implement the teachings described herein.

Embodiments claimed may include software capable of performing one or more of the operations described herein. Although the claimed subject matter is not limited in scope in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions that when executed by a system, such as a computer system, computing platform, or other system, for example, may result in an embodiment of a method in accordance with the claimed subject matter being executed, for example.

In the following description and/or claims, the term "and/or" may mean "and", it may mean "of", it may mean "exclusive-or", it may mean "one", it may mean "some, but not all", it may mean "neither", and/or it may mean "both", although the scope of claimed subject matter is not limited in this respect.

Reference throughout this specification to "one embodiment" or "an embodiment" means that a particular feature, structure, or characteristic described in connection with the embodiment is included in at least one embodiment of the claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring to FIG. 1, a block diagram illustrates a control unit 100 and vehicle 102 according to one or more embodiments, although the claimed subject matter is not limited in scope in this respect. Control unit 100 and/or vehicle 102 may include more and/or fewer components than those shown in FIG. 1. However, generally conventional components may not be shown, for example) a battery, a bus, and so on.

Control unit 100, as shown in FIG. 1 may be utilized to tangibly embody a computer program and/or graphical user interface by providing hardware components on which the computer program and/or graphical user interface may be executed. Such a computer program and/or machine readable instructions may be tangibly stored on a computer and/or machine readable medium such as a compact disk (CD), digital versatile disk (DVD), flash memory device, hard disk drive (HDD), and so on. As shown in FIG. 1, control unit 100 may be controlled by processor 104, including one or more auxiliary processors (not shown). Processor 104 may comprise a central processing unit such as a microprocessor or microcontroller for executing programs, performing data manipulations, and controlling the tasks of control unit 100. Auxiliary processors may manage input/output, perform floating point mathematical operations, manage digital signals, perform fast execution of signal processing algorithms, operate as a back-end processor and/or a slave-type processor subordinate to processor 104, operate as an additional microprocessor and/or controller for dual and/or multiple processor systems, and/or operate as a coprocessor and/or additional processor. Such auxiliary processors may be discrete processors and/or may be arranged in the same package as processor 104, for example, in a multicore and/or multithreaded processor; however, the scope of the claimed subject matter is not limited in these respects.

Communication with processor 104 may be implemented via a bus (not shown) for transferring information among the components of control unit 100. A bus may include a data channel for facilitating information transfer between storage and other peripheral components of control unit 100. A bus further may provide a set of signals utilized for communication with processor 104, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of control unit 100 may include, for example, memory 106, including one or more auxiliary memories (not shown). Memory 106 may provide storage of instructions and data for programs to be executed by processor 104, such as control program 108, for example. Memory 106 may be, for example, semiconductor-based memory such as dynamic random access memory (DRAM) and/or static random access memory (SRAM), and/or the like. Other semiconductor-based memory types may include, for example, synchronous dynamic random access memory (SDRAM), Rambus dynamic random access memory (RDRAM), ferroelectric random access memory (FRAM), and so on. Alternatively or additionally, memory 106 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 106 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Control unit 100 further may include a display 110. Display 110 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 110 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Control unit 100 further may include one or more I/O devices 112. I/O device 112 may comprise one or more I/O devices 112 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like. For example, I/O device 112 may comprise a microphone and/or a speaker. The microphone may be capable of converting sound waves into an electric current. The speaker may be capable of converting electrical signals into sounds loud enough to be heard. The microphone and/or speaker may be capable of converting verbal commands of a user into an electric current to trigger a response or action by control unit 100.

Control unit 100 further may include an external interface 114. External interface 114 may comprise one or more controllers and/or adapters to prove interface functions between multiple I/O devices 112. For example, external interface 114 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the lice, to interface between corresponding I/O devices 112.

Control unit 100 further may include a wireless system 116. Wireless system 116 may comprise one or more devices for wireless connections and/or wireless communications. External interface 114 and/or wireless system 116 may provide and/or receive analog and/or digital signals to communicate between control unit 100 and external devices, networks, and/or information sources, such as vehicle 102, for example. External interface 114 and/or wireless system 116 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area. networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point-to-point protocol (SLIP/PPP), and so on.

Wireless system 116 may include a wireless communication device 118. Wireless communication device 118 may communicate between control unit 100 and external devices, networks, and/or information sources. For example, wireless communication device 118 may be capable of communicating over a wireless communication network 120. Wireless communication network 120 may comprise one or more of the following: a cellular phone network, a two-way radio network, an Internet network, a virtual private broadband network, a peer-to-peer voice over Internet protocol (IP) system, a local area network (LAN), a wireless local area network (WLAN), a wireless wide area network (WWAN), a wireless fidelity network (WiFi), a worldwide interoperability for microwave access network (WiMax), a multiple input multiple output antenna network (MIMO), a time division/domain multiple access network (TDMA), a code division multiple access network (CDMA), a Bluetooth network, an ultra wide band network (UWB), and/or a space division multiple access network (SDMA), the like, or combinations thereof, according to the particular application.

Wireless system 116 may include a wireless connection device 122. Wireless connection device 122 may wirelessly connect between control unit 100 and external devices, such as wirelessly communicating with vehicle 102, for example. As used herein, the term "wireless connection device" may be any device capable of short-range wireless connection between two or more electronic devices thereof, according to the particular application. For example wireless connection device 122 may be a Bluetooth connection device, and/or the like, according to the particular application.

Wireless system 116 may include a radio frequency identification device 124 (referred to as REID device 124 hereinafter). As used herein, the term "RFID device" may be any device capable of transferring radio frequency identification information. Examples of RFID devices may include, but are not limited to, active RFID devices, passive RFID devices, the like, and/or combinations thereof, according to the particular application. RFID device 124 may communicate between control unit 100 and external devices, networks, and/or information sources, such as wirelessly communicating with vehicle 102, for example. Additionally or alternatively, RFID device 124 may be capable of communicating with a second RFID device 126 located adjacent or remote from control unit 100 to transfer RFID information between RFID device 124 and RFID device 126. For example, RFID device 124 may include an RFID reader and/or an RFID tag, where RFID reader of RFID device 124 may retrieve RFID information from an RFID tag of RFID device 126 and/or where RFID tag of RFID device 124 may deliver RFID information to RFID reader of RFID device 126. RFID device 124 may be coupled to wireless communication device 118 to be capable of communicating information, such as RFID information, via wireless communication network 120. Additionally or alternatively, an RFID ionosphere 128 may be in communication with RFID device 126 so that control unit 100 may be capable of communicating information, such as RFID information via RFID device 126 and RFID ionosphere 128. As used herein, the term "RFID ionosphere" may be any system capable of communicating RFID information.

Control unit 100 further may communicate with an external server 130. For example, control unit 100 may communicate with external server 130 via external interface 114 and/or wireless system 116 to supply information and/or data to control unit 100. Additionally or alternatively, control unit 100 may communicate with external server 130 via RFID device 124 through RFID ionosphere 128. Additionally or alternatively, control unit 100 may communicate with external server 130 via wireless communication device 118 through wireless communication network 120.

As discussed above, control unit 100 may communicate in one or more various ways with vehicle 102. Vehicle 102 may comprise many components similar to those described above with respect to control unit 100. For example, vehicle 102 may comprise one or more of the following: processor 134, memory 136, control program 138, display 140, I/O device 142, external interface 144, wireless system 146, wireless communication device 148, wireless connection device 152, RFID device 154. A description of the operation of these components of vehicle 102 will be understood from the corresponding description above with respect to control unit 100.

The versions of control program 138 that may be installed in vehicle 102 and the versions of control program 108 that may be installed in control unit 100 may differ in various ways. The versions of control program 108 that may be installed in control unit 100 may be specific to the operating system of control unit 100 and may need to be programmed to a specific application programming interface (API), such as a Symbian platform or a Microsoft Windows CE operating system as well as individual devices hardware API, although the scope of the claimed subject matter is not limited in this respect. Further, versions of control program 108 that may be installed in control unit 100 may be more command and response based, while the versions of control program 138 that may be installed in vehicle 102 may be specific to both manufacturers hardware and software API. Additionally or alternatively, the versions of control program 138 that may be installed in vehicle 102 may be adapted to interact directly with vehicle systems 160 to enable vehicle systems 160 to actualize vehicle system settings, communicate outside vehicle 102, display results back to control unit 100, and/or display results on display 140 of vehicle 102. Control program 138 installed in vehicle 102 and/or control program 108 installed in control unit 100 may be additionally or alternatively capable of monitoring, changing and communicating with environments inside and outside vehicle 102.

I/O device 142 of vehicle 102 may comprise a microphone and/or a speaker. The microphone may be capable of converting sound waves into an electric current. The speaker may be capable of converting electrical signals into sounds loud enough to be heard. The microphone and/or speaker may be capable of converting verbal commands of a user into an electric current to trigger a response or action by vehicle 102.

Wireless connection device 152 of vehicle 102 may wirelessly connect between vehicle 102 and external devices, such as wirelessly communicating with control unit 100, for example. For example, wireless connection device 152 may wirelessly connect with corresponding wireless connection device 122 of control unit 100. Additionally or alternatively, RFID device 154 may communicate between vehicle 102 and external devices, networks, and/or information sources, such as wirelessly communicating with control unit 100, for example. For example, RFID device 154 may wirelessly connect with corresponding RFID device 124 of control unit 100.

Vehicle 102 may include a global positioning system device 156 (referred to as GPS device 156 hereinafter). As used herein, the term "GPS device" may be any device capable of determining global position, according to the particular application. GPS device 156 may be capable of communicating with a GPS satellite 158 to transfer location information, such as coordinate location information, between GPS device 156 and one or more GPS satellites 158 and/or a constellation of satellites and/or space vehicles and/or ground equipment.

Vehicle 102 may include one or more vehicle systems 160. Vehicle system 160 may communicate with processor 134 via a bus (not shown), external interface 144, and/or wireless system 146, the like, or combinations thereof. For example, vehicle system 160 may communicate with processor 134 via wireless connection device 152, and/or RFID device 154, the like, or combinations thereof. Vehicle system 160 may include one or more of the following: a vehicle component system 162, a media system 164, an environmental system 166, and/or an information direction system 168, the like, or combinations thereof.

Figure 2:
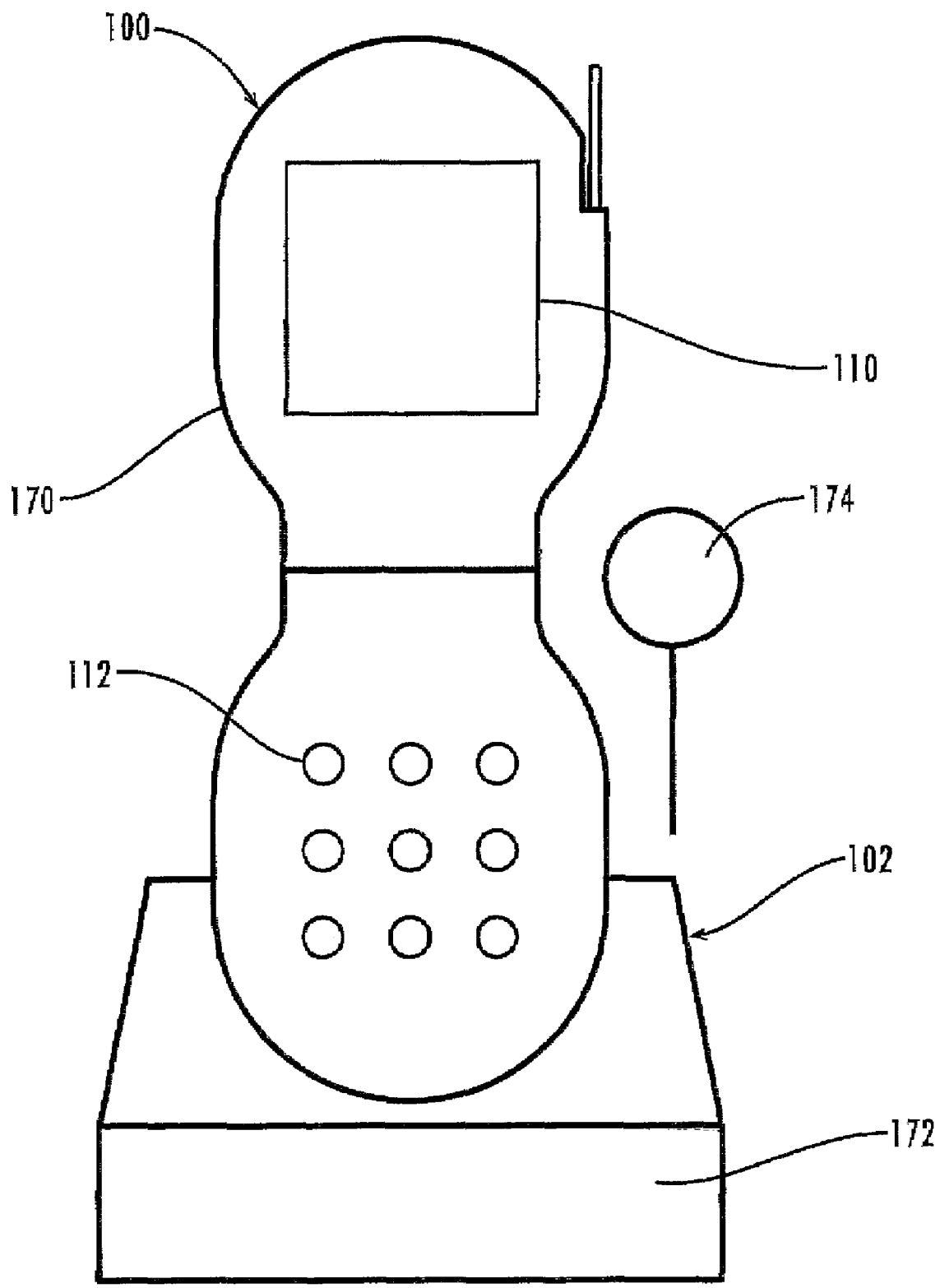
FIG. 2 is an illustration of a control unit in accordance with one or more embodiments.

Referring to FIG. 2, an illustration of control unit 100 according to one or more embodiments is shown, although the claimed subject matter is not limited in scope in this respect. Control unit 100 may include more and/or fewer components than those shown in FIG. 2. However, generally conventional components may not be shown, for example a battery, a processor, and so on. Illustrated in FIG. 2, control unit 100 may include a housing 170 that may be capable of being personally portable, such as, for example, being carried and/or worn by a user, although the claimed subject matter is not limited in scope in tins respect. As used herein, the term "personally portable" comprises, but is not limited to, being capable of being carried on and/or by a person. Additionally or alternatively, housing 170 may be capable of being selectively moved between a selected first or second vehicle 102, although the claimed subject matter is not limited in scope in this respect. Housing 170 may comprise any number of devices, such as, for example, a cellular phone, a hand held device, a wrist worn device, a device worn on belt and/or belt clip, a device coupled to a key chain, and/or the like, or combinations thereof, although the claimed subject matter is not limited in scope in this respect.

Housing 170 may be capable of housing all or a portion of control unit 100, such as, for example, external interface 114 and/or wireless system 116, the like, or combinations thereof, according to the particular application. Housing 170 may be coupled to external interface 114 and/or wireless system 116, where control unit 100 may be capable of communicating between housing 170 and the selected first or second vehicle 102 via external interface 114 and/or wireless system 116, although the claimed subject matter is not limited in scope in this respect.

Vehicle 102 may comprise a cradle 172 capable of holding control unit 100 within vehicle 102. External interface 144 and/or wireless system 146 of vehicle 102 may be incorporated with cradle 172 to provide communication between vehicle 102 and control unit 100, although the claimed subject matter is not limited in scope in this respect. Additionally or alternatively, vehicle 102 may comprise a system enable button 174. System enable button 174 may trigger the connection between vehicle 102 and control unit 100 and/or trigger the activation of vehicle system settings. Once vehicle system settings are transferred by processor 134 of vehicle 102, control program 138 may be executed to actualize vehicle system settings such as, for example, settings for external communications from interior GPS device 156 and RFID device 154 to external server 130 for data services from multiple data points and content suppliers to bring desired information and content not normally available inside vehicle 102.

Figure 3:
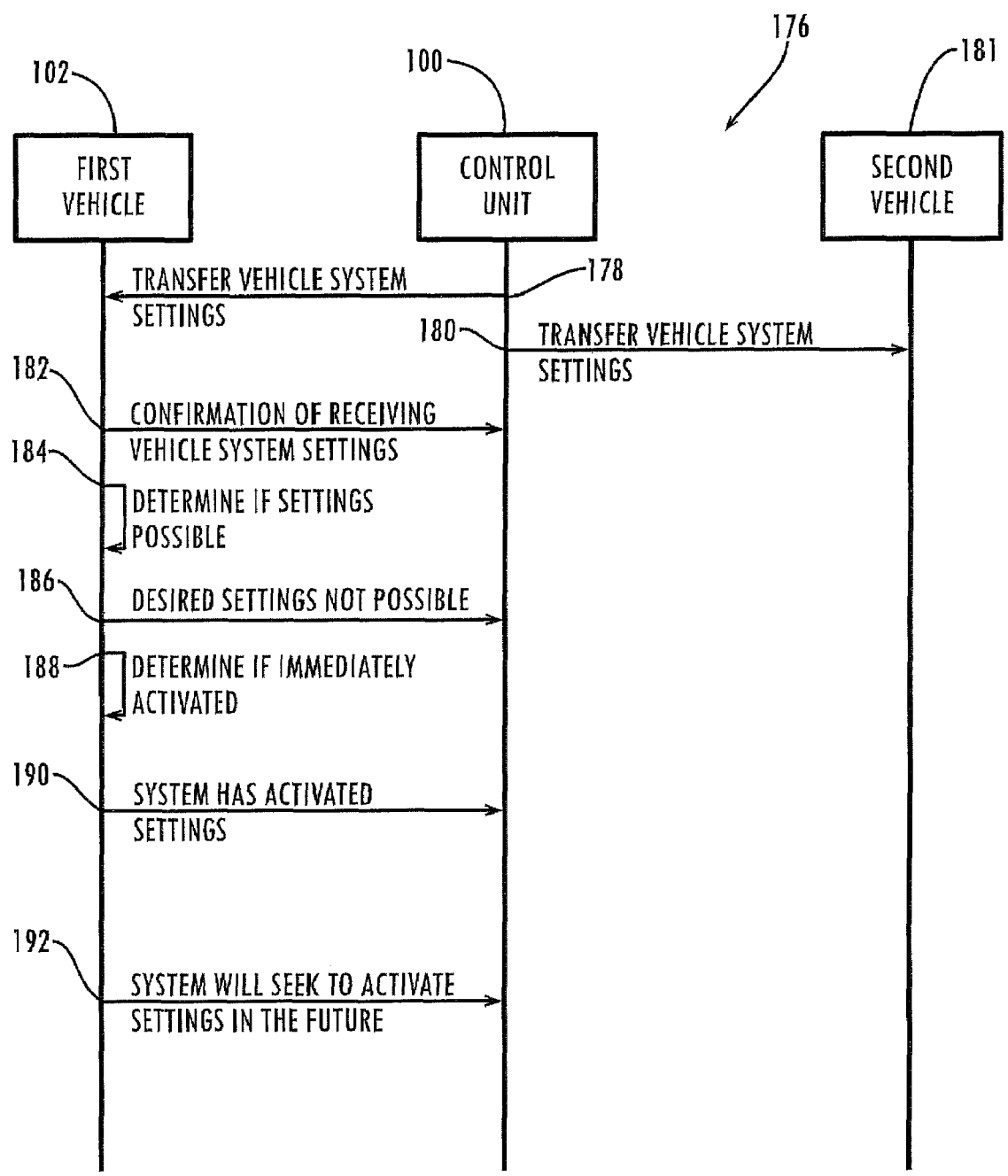
FIG. 3 is a flow diagram of a procedure for operating a control unit and/or a vehicle in accordance with one or more embodiments.

Referring now to FIG. 3, a flow diagram illustrates an example procedure for operating control unit 100 and/or vehicle 102 in accordance with one or more embodiments, although the claimed subject matter is not limited in scope in this respect. The procedure illustrated in FIG. 3 may be used to transfer one or more vehicle system settings from control unit 100 to the selected first or second vehicle 102, for example, although the claimed subject matter is not limited in this respect. Additionally, although procedure 176, as shown in FIG. 3, comprises one particular order of blocks, the order in which the blocks are presented does not necessarily limit the claimed subject matter to any particular order. Likewise, intervening blocks shown in FIG. 3 and/or additional blocks not shown in FIG. 3 may be employed and/or blocks shown in FIG. 3 may be eliminated, without departing from the scope of the claimed subject matter.

Procedure 176 depicted in FIG. 3 may in alternative embodiments be implemented in software, hardware, and/or firmware, and may comprise discrete operations. As illustrated, procedure 176 starts at block 178 where control unit 100 may transfer one or more vehicle system settings to a first vehicle 102 if in communication with the first vehicle 102. At block 180, control unit 100 may transfer the one or more vehicle system settings to a second vehicle 181 if in communication with the second vehicle 181. The one or more vehicle system settings may comprise settings for one or more of the following vehicle systems 160: vehicle component system 162, media system 164, environmental system 166, and/or information direction system 168, the like, or combinations thereof.

At block 182, vehicle 102 may transmit a confirmation of receiving vehicle system settings message received by control unit 100 and/or received by a user. Additionally or alternatively, vehicle 102 may transmit a confirmation of receiving vehicle system settings message to a user via display 140, and/or I/O device 142, the like, or combinations thereof, although the scope of the claimed subject matter is not limited in this respect.

At block 184, vehicle 102 may determine if the received vehicle system settings are possible. If the received vehicle system settings are not possible, vehicle 102 may transmit a desired settings not possible message at block 186 received by control unit 100 and/or received by a user. If the received vehicle system settings are possible, vehicle 102 may determine if the received vehicle system settings are immediately activated, at block 188. If the received vehicle system settings are immediately activated, vehicle 102 may transmit a system has activated settings message at block 190 received by control unit 100 and/or received by a user. If the received vehicle system settings are not immediately activated, vehicle 102 may transmit a system will seek to activate settings in the future message at block 192 received by control unit 100 and/or received by a user. Additionally or alternatively, additional steps may be taken upon a confirmation input from the user to control unit 100 and/or vehicle 102, no action from the user to control unit 100 and/or vehicle 102, and/or a reset request from the user to control unit 100 and/or vehicle 102.

Referring now to FIGS. 1-3, in operation, control unit 100 may comprise a portable device enabled via software to be capable of transferring vehicle system settings to an automated set of vehicle control systems such as, for example, vehicle systems 160. Accordingly, control unit 100 may permit a user's preferred set of custom vehicle system settings to be transferred to one or more vehicles 102 to which the user seeks the implementation of their custom vehicle system settings. Additionally or alternatively, control unit 100 may integrate wireless system 116 as a storage tool and interface conduit for porting settings to one or more vehicles 102. Accordingly, a control unit 100 running control program 108 and vehicle 102 running control program 138 may implement a user's preferred set of custom vehicle system settings by enacting the software and settings contained within control unit 100. For example, a user's preferred set of custom vehicle system settings may be initiated while inside vehicle 102 by cradling control unit 100 in cradle 172, RFID signaling (such as, for example, RFID device 124), and/or via Bluetooth connection (such as, for example, via wireless connection device 122), the like, or combinations thereof, although the scope of the claimed subject matter is not limited in this respect. Additionally or alternatively, a user's preferred set of custom vehicle system settings may be initiated once control unit 100 has been activated within the confines of vehicle 102, for example, by activating system enable button 174, although the scope of the claimed subject matter is not limited in this respect. Control unit 100 may be capable of being loaded with the user's preferred set of custom vehicle system settings either directly through I/O device 112, porting the settings to control unit 100 from vehicle 102, and/or porting the settings to control unit 100 from a personal computing device (not shown), although the scope of the claimed subject matter is not limited in this respect. In addition to certain direct vehicle system settings such as setting the internal temperature of vehicle 102, the user may also enter more complex vehicle system settings, including time dependent vehicle system settings. For example, vehicle system settings may include a request to play mellow music before 10 AM and raucous rock and roll from 5-7 PM. Certain vehicle system settings may then occur automatically at their scheduled times, such as seat settings, media settings for radio and video availability, internal temperature and gauge warnings.

Additionally or alternatively, with control program 108 and 138 connected between control unit 100 and vehicle 102, vehicle 102 may display and/or voice activate dialogue with the user. Vehicle system settings and confirmations of vehicle system settings may be instituted within vehicle 102 with one or more of the following: information and direction history from information direction system 168, media settings from media system 164, the inside environmental settings from environmental system 166, and/or vehicle component settings from vehicle component system 162, the like, or combinations thereof, although the scope of the claimed subject matter is not limited in this respect.

Additionally or alternatively, control unit 100 and/or vehicle 102 may perform communications outside vehicle 102 via wireless system 116 and/or wireless system 146. For example, control unit 100 and/or vehicle 102 may make requests and/or default requests to gain access to any data that may be available outside vehicle 102 via one or more of the following: wireless communication network 120, RFID ionosphere 128, external server 130, and/or GPS satellite 158, the like, or combinations thereof, although the scope of the claimed subject matter is not limited in this respect. Settings, resets, current status, and/or future recommendations made by control unit 100 and/or vehicle 102 may be displayed on display 110 and/or display 140, communicated via a voice activated system such as through I/O device 112 and/or I/O device 142, and/or communicated to a third party device such as external server 130, although the scope of the claimed subject matter is not limited in this respect. Accordingly, third parties such as, for example, parents and/or rental car companies may track user behavior via control unit 100 and/or vehicle 102.

Control unit 100 and/or vehicle 102 may include additional components not shown in FIGS. 1-3 and/or components shown in FIGS. 1-3 may be eliminated, without departing from the scope of the claimed subject matter. For example, control unit 100 may comprise a compact disc, chip, and/or cartridge, the like, or combinations thereof, which may communicate with I/O device 142 of vehicle 102 to transfer vehicle system settings from control unit 100 to vehicle 102, although the scope of the claimed subject matter is not limited in this respect. Additionally or alternatively, vehicle 102 may be adapted to receive a code from user to trigger transfer of vehicle system settings from external server 130 to vehicle 102, although the scope of the claimed subject matter is not limited in this respect.

Figure 4:
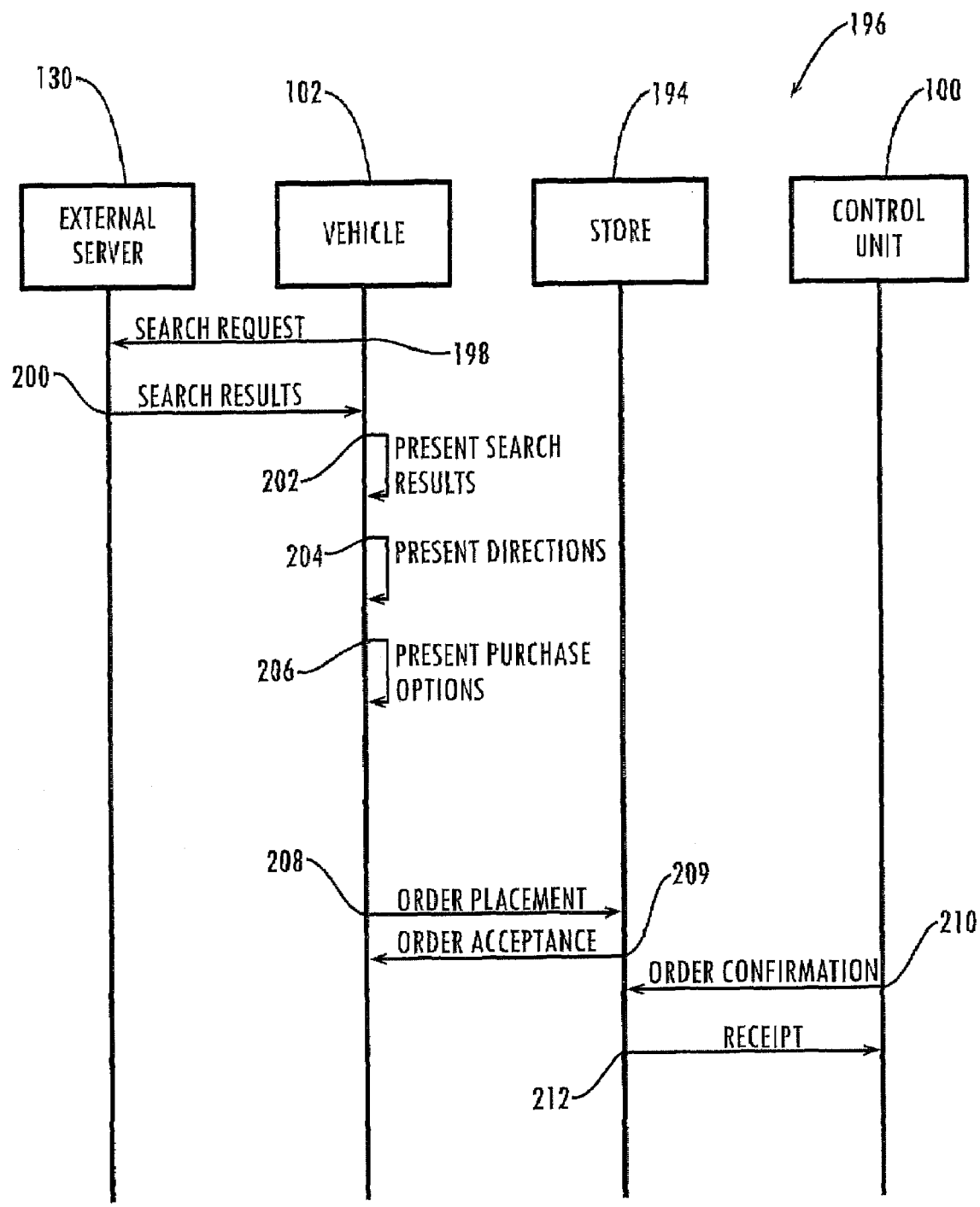
FIG. 4 is a flow diagram of a procedure for operating a control unit and/or a vehicle in accordance with one or more embodiments.

Referring now to FIG. 4, a flow diagram illustrates an example procedure for communicating an order placement via control unit 100 and/or vehicle 102 in accordance with one or more embodiments, although the claimed subject matter is not limited in scope in tins respect. The procedure illustrated in FIG. 4 may be used to communicate an order placement between vehicle 102 and a store 194 via wireless system 146 of vehicle 102 and/or to communicate an order confirmation between housing 170 and store 194 via wireless system 116 of control unit 100 where control unit 100 may be operating outside vehicle 102, for example, although the claimed subject matter is not limited in this respect. Additionally, although procedure 196, as shown in FIG. 4, comprises one particular order of blocks, the order in which the blocks are presented does not necessarily limit the claimed subject matter to any particular order. Likewise, intervening blocks shown in FIG. 4 and/or additional blocks not shown in FIG. 4 may be employed and/or blocks shown in FIG. 4 may be eliminated, without departing from the scope of the claimed subject matter.

Procedure 196 depicted in FIG. 4 may in alternative embodiments be implemented in software, hardware, and/or firmware, and may comprise discrete operations. As illustrated, procedure 196 starts at block 198 where vehicle 102 may submit a search request. For example, vehicle 102 may submit a search request to external server 130 to search for a store, such as store 194, based at least in part on one or more search criteria, although the claimed subject matter is not limited in this respect. At block 200, vehicle 102 may receive search results from external server 130. At block 202, vehicle 102 may present search results. For example, vehicle 102 may present search results visually and/or acoustically via display 140 and/or via I/O device 142, and/or vehicle 102 may transmit such information to control unit 100 to be presented visually and/or acoustically via display 110 and/or via I/O device 112, although the claimed subject matter is not limited in this respect. At block 204, vehicle 102 may present directions to one or more selected stores 194. At block 206, vehicle 102 may present one or more available purchase options of store 194. For example, vehicle 102 may present one or more available purchase options of store 194 in a ranked order based at least in part on one or more prior purchases, although the claimed subject matter is not limited in this respect. At block 208, vehicle 102 may communicate an order placement between vehicle 102 and store 194. For example, vehicle 102 may communicate an order placement between vehicle 102 and store 194 via wireless system 146, although the claimed subject matter is not limited in this respect. At block 209, an order acceptance message may be received at vehicle 102 from store 194. At block 210, control unit 100 may communicate an order confirmation between control unit 100 and store 194. For example, control unit 100 may communicate an order confirmation between control unit 100 and store 194 via wireless system 116 where control unit 100 may be located outside vehicle 102, such as when control unit 100 is located within store 194, although the claimed subject matter is not limited in this respect. At block 212, store 194 may communicate a receipt of the transaction to control unit 100.

Figure 5:
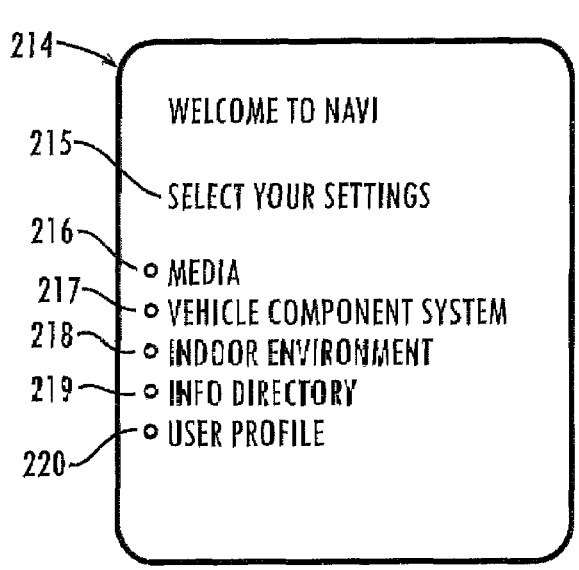
FIG. 5 depicts a representation of a screen shot of a control unit and/or a vehicle in accordance with one or more embodiments.

Referring now to FIG. 5, a representation of a screen shot of control unit 100 and/or vehicle 102 is depicted in accordance with one or more embodiments, although the claimed subject matter is not limited in scope in this respect. The screen shot illustrated in FIG. 5 may be a general user interface welcome screen 214 that may be accessed through control unit 100 and/or vehicle 102. For example, general user interface welcome screen 214 may be presented to a user via display 140 and/or I/O device 142 of vehicle 102, and/or via display 110 and/or I/O device 112 of control unit 100, although the claimed subject matter is not limited in this respect. General user interface welcome screen 214 may be triggered through control unit 100 contact with cradle 172, and/or may be triggered through voice activation, touch screen, and or keypad through I/O device 142 of vehicle 102 and/or I/O device 112 of control unit 100. General user interface welcome screen 214 may allow a user to go to another screen to select settings outside vehicle 102 via field 215. General user interface welcome screen 214 may allow a user to set vehicle system settings for media system 164 via field 216, vehicle component system 162 via field 217, environmental system 166 via field 218, information direction system 168 via field 219, and/or user profile display data via field 220. For example, a user may select field 219 to access a general user interface page for information and directions, although the claimed subject matter is not limited in this respect.

Figure 6:
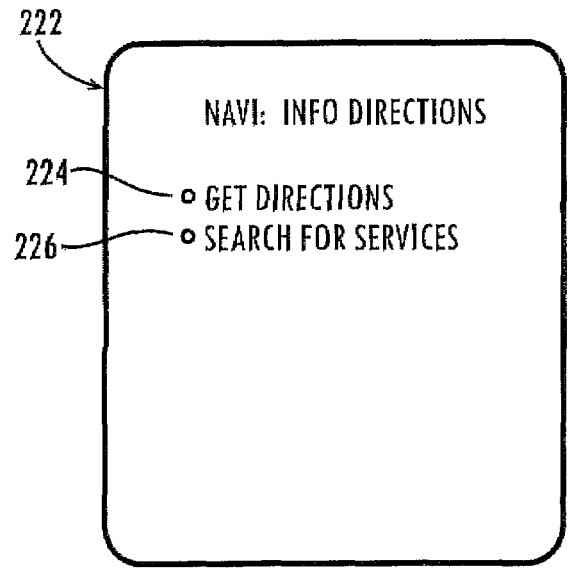
FIG. 6 depicts a representation of a screen shot of a control unit and/or a vehicle in accordance with one or more embodiments.

Referring now to FIG. 6, a representation of a screen shot of control unit 100 and/or vehicle 102 is depicted in accordance with one or more embodiments, although the claimed subject matter is not limited in scope in this respect. The screen shot illustrated in FIG. 6 may be a general user interface page 222 for information and directions. General user interface page 222 may display choices to one or more of the following options: get directions via field 224 and/or search for services via field 226. For example, a user may select field 226 to access a service search result page, although the claimed subject matter is not limited in this respect.

Figure 7:
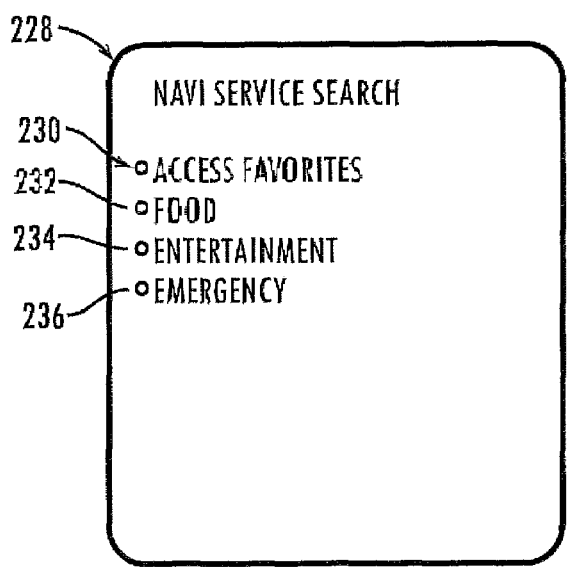
FIG. 7 depicts a representation of a screen shot of a control unit and/or a vehicle in accordance with one or more embodiments.

Referring now to FIG. 7, a representation of a screen shot of control unit 100 and/or vehicle 102 is depicted in accordance with one or more embodiments, although the claimed subject matter is not limited in scope in this respect. The screen shot illustrated in FIG. 7 may be a service search result page 228. Service search result page 228 may list services to choose from. For example, service search result page 228 may display choices to one or more of the following options: favorites via field 230, food choices via field 232, entertainment choices via field 234, and/or emergency services via field 236. For example, a user may select field 230 to access a favorites result page, although the claimed subject matter is not limited in this respect.

Figure 8:
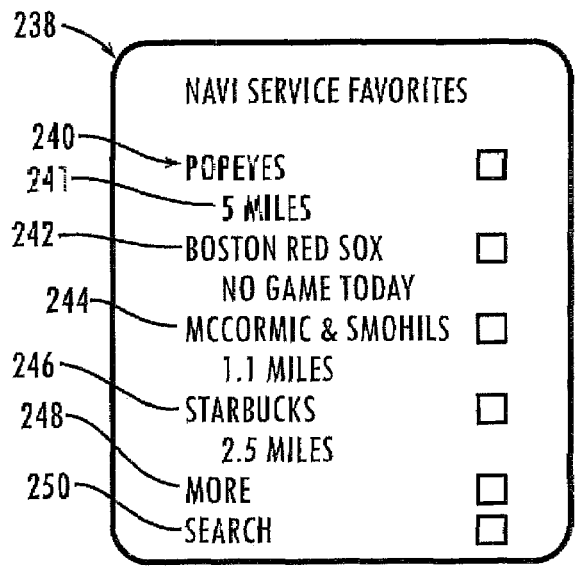
FIG. 8 depicts a representation of a screen shot of a control unit and/or a vehicle in accordance with one or more embodiments.

Referring now to FIG. 8, a representation of a screen shot of control unit 100 and/or vehicle 102 is depicted in accordance with one or more embodiments, although the claimed subject matter is not limited in scope in this respect. The screen shot illustrated in FIG. 8 may be a favorites result page 238. Favorites result page 238 may display choices to one or more options in a ranked order based at least in part on one or more prior purchases and/or activities. For example, favorites result page 238 may display choices to one or more of the following options: Popeye's restaurant via field 240 including the distance to the restaurant which may selected via field 241 to get specific directions using GPS mapping technology, Boston Red Sox via field 242 including generating the result that there is no game scheduled for today based on external data from external server 130, the fictitious McCormick & Smohils restaurant via field 244, Starbucks via field 246, more options via field 248, and/or additional search options via field 250, although the claimed subject matter is not limited in this respect. For example, a user may select field 240 to access a store result page, although the claimed subject matter is not limited in this respect.

Figures 9, 10:
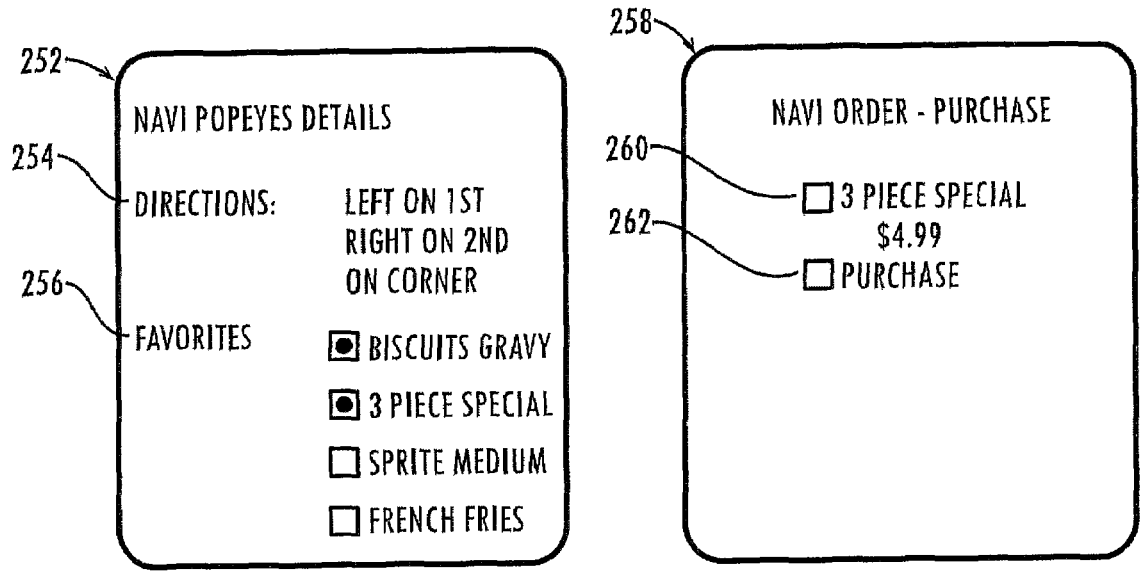
FIG. 9 depicts a representation of a screen shot of a control unit and/or a vehicle in accordance with one or more embodiments.
FIG. 10 depicts a representation of a screen shot of a control unit and/or a vehicle in accordance with one or more embodiments.

Referring now to FIG. 9, a representation of a screen shot of control unit 100 and/or vehicle 102 is depicted in accordance with one or more embodiments, although the claimed subject matter is not limited in scope in this respect. The screen shot illustrated in FIG. 9 may be a store result page 252. Store result page 252 may display related information for the selected store 194 and/or may provide a voice activated sequence. Store result page 252 may display related information for the selected store 194 including, but not limited to, directions to store 194 via field 254 and/or a list of order options via field 256. For example, the list of order options may include favorite items from the selected store 194 in a ranked order based at least in part on one or more prior purchases and/or activities, although the claimed subject matter is not limited in this respect. For example, a user may select a particular item via field 256 to access an order placement page, although the claimed subject matter is not limited in this respect.

Referring now to FIG. 10, a representation of a screen shot of control unit 100 and/or vehicle 102 is depicted in accordance with one or more embodiments, although the claimed subject matter is not limited in scope in this respect. The screen shot illustrated in FIG. 10 may be an order placement page 258. Order placement page 258 may display one or more selected items for purchase via field 260, and/or a purchase option via field 262. For example, a user may select a particular item via field 260 and may trigger an order placement to store 194 via field 262, although the claimed subject matter is not limited in this respect.

Figure 11:
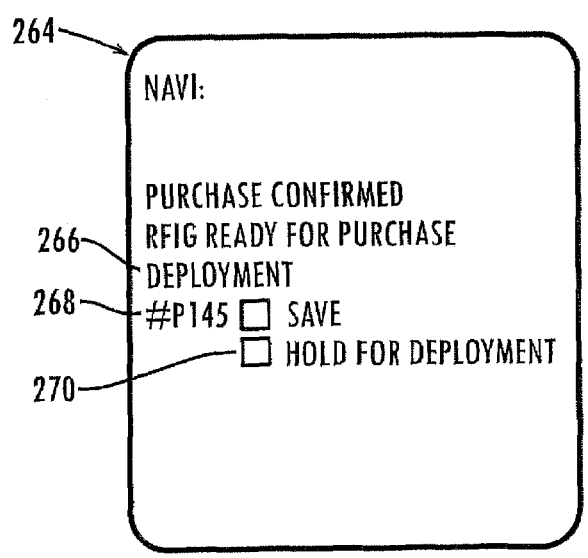
FIG. 11 depicts a representation of a screen shot of a control unit and/or a vehicle in accordance with one or more embodiments.

Referring now to FIG. 11, a representation of a screen shot of control unit 100 and/or vehicle 102 is depicted in accordance with one or more embodiments, although the claimed subject matter is not limited in scope in this respect. The screen shot illustrated in FIG. 11 may be an order confirmation page 264. Order confirmation page 264 may display one or more of the following: an option to confirm the transaction for deployment via field 266, an option to save the transaction via field 268, or an option to hold for deployment at a more ideal time via field 270. For example, an RFIG file may be communicated via RFID ionosphere 128 to store 194 once control unit 100 has been brought to and/or within the point of purchase store 194, although the claimed subject matter is not limited in this respect. Additionally or alternatively, the RFIG file may be saved or held for deployment at a more ideal time, although the claimed subject matter is not limited in this respect.

Referring now to FIGS. 4-11, in operation, control unit 100 and/or vehicle 102 may communicate an order placement to store 194. The order placement to store 194 may be sent via wireless communication network 120, via RFID ionosphere 128, and/or via a similar system from vehicle 102, although the claimed subject matter is not limited in this respect. The order placement to store 194 may include a message to get the ordered item ready for pickup and/or may include relevant billing information. The order placement to store 194 may be received by a server system of store 194. Upon arrival at store 194 a user may take portable control unit 100 into store 194 where the order confirmation signal may be communicated to store 194. For example, store 194 may have a register (not shown) comprising an RFID device, a database, and/or a content delivery system which communicates a receipt for the transaction and triggers the ordered item to be transferred to the user, although the claimed subject matter is not limited in this respect. The receipt confirmation may then be printed out for records by the user, emailed as a record, transferred wirelessly as a record. Additionally or alternatively, the receipt confirmation may be utilized by information direction system 168 of vehicle 102, either when control unit 100 is turned on and/or upon control unit 100 being reactivated, to update user behavior, although the claimed subject matter is not limited in this respect.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. A method, comprising:
   detecting a portable control unit positioned within or proximate to a vehicle;
   identifying a user profile associated with the portable control unit;
   displaying a list of options associated with the user profile;
   communicating an order to a store via a first wireless system associated with the vehicle, wherein the order is selected from the list of options, and wherein the order comprises billing information associated with the user profile;
   receiving an order confirmation from the store; and
   transmitting the order confirmation to the portable control unit to enable the portable control unit to confirm the order through communication with the store via a second wireless system associated with the portable control unit while the portable control unit is located in the store and distant from the vehicle.

2. The method of claim 1, further comprising searching for the store based, at least in part, on a history of prior orders from the store that are associated with the user profile.

3. The method of claim 1, further comprising presenting directions to the store.

4. The method of claim 2, further comprising presenting one or more available purchase options of the store corresponding to the history of prior orders.

5. The method of claim 4, further comprising ranking the one or more available purchase options based, at least in part, on a number of times the one or more available purchase options have previously been ordered.

6. The method of claim 1, further comprising:
   searching for the store based, at least in part, on one or more search criteria;
   determining directions to the store; and
   presenting one or more available purchase options of the store.

7. An apparatus, comprising:
   means for detecting a mobile control unit positioned within a vehicle;
   means for identifying a user associated with the mobile control unit;
   means for determining a user profile associated with the user;
   means for displaying a list of options associated with the user profile;
   means for communicating an order to a place of business using a communication system associated with the vehicle, wherein the order is selected from the list of options, and wherein the order comprises stored information associated with the user profile;
   means for receiving an order confirmation from the place of business; and
   means for transmitting the order confirmation to the mobile control unit to enable the mobile control unit to confirm the order while the mobile control unit is in the place of business and distant from the vehicle.

8. The apparatus of claim 7, further comprising means for searching for the place of business based, at least in part, on one or more search criteria of the stored information.

9. The apparatus of claim 7, further comprising means for presenting directions to the place of business.

10. The apparatus of claim 7, further comprising means for presenting one or more available purchase options of the place of business based on user preferences associated with the user profile.

11. The apparatus of claim 7, further comprising means for presenting one or more available purchase options of the place of business in a ranked order based, at least in part, on one or more prior purchases made by the user.

12. The apparatus of claim 7, further comprising:
means for searching for the place of business based, at least in part, on one or more search criteria provided in the stored information;
means for determining directions to the place of business; and
means for presenting one or more available purchase options of the place of business based on a number of times the one or more available purchase options have previously been ordered.

13. An article of manufacture, comprising a computer-readable medium having stored thereon computer-executable instructions that, in response to being executed by a system, cause the system to perform operations comprising:
storing a user profile on a mobile control unit, wherein the user profile includes one or more user preferences based on a history of prior purchases;
transmitting the user profile to an onboard vehicle communication system of a vehicle;
receiving an order confirmation including billing information associated with the user profile from the onboard vehicle communication system;
communicating the order confirmation to a register via a short range wireless communication system associated with the mobile control unit while the mobile control unit is near the store and distant from the vehicle; and
receiving a receipt confirmation from the register via the short range wireless communication system indicating that the billing information was accepted.

14. The article of manufacture of claim 13, wherein the operations further comprise searching for a location based, at least in part, on the user preferences.

15. The article of manufacture of claim 14, wherein the operations further comprise presenting directions to the location based, at least in part, on the user preferences.

16. The article of manufacture of claim 14, wherein the operations further comprise presenting one or more available purchase options of the location based, at least in part, on the user preferences.

17. The article of manufacture of claim 14, wherein the operations further comprise presenting one or more available purchase options of the location in a ranked order based, at least in part, on one or more prior purchases.

18. The article of manufacture of claim 14, wherein the operations further comprise:
searching for the location based, at least in part, on one or more search criteria;
determining directions to the location; and
presenting one or more available purchase options of the location based, at least in part, on the user preferences.

19. A system, comprising:
a holding device configured to be mounted to a vehicle;
a mobile control unit configured to communicatively interface with the vehicle via the holding device;
a memory device configured to store a user identification, wherein the user identification is communicated to the vehicle when the mobile control unit is located in the holding device;
a display device configured to display a list of purchase options based, at least in part, on one or more user preferences associated with the user identification;
a first wireless communication device associated with the vehicle and configured to:
place an order comprising a selection from the list of purchase options to a business; and
receive an order confirmation from the business; and
a second, short range wireless communication system associated with the mobile control unit, wherein the mobile control unit is configured to confirm the order placed from the first wireless communication device, and wherein the order is confirmed via the second, short range wireless communication system while the mobile control unit is located proximate to a store register of the business and distant from the vehicle.

20. The system of claim 19, wherein the second, short range wireless communication system comprises an RFID device.

21. The system of claim 19, wherein the mobile control unit is configured to communicatively interface with a second vehicle, and wherein the user identification is communicated to the second vehicle.

22. The system of claim 21, further comprising a second holding device configured to be mounted to the second vehicle, wherein the mobile control unit communicatively interfaces with the second vehicle via the second holding device.

23. The system of claim 19, wherein the mobile control unit comprises a mobile phone.

24. The system of claim 19, wherein the memory device is located within the mobile control unit.

25. The system of claim 19, wherein the holding device comprises a cradle.

26. The system of claim 19, wherein the mobile control unit is further configured to transmit the user identification to the store register via the second, short range wireless communication system.

27. The system of claim 26, wherein the mobile control unit is further configured to confirm the order by transmitting the user identification to the store register.

28. The system of claim 19, wherein the order comprises billing information associated with the user identification.

29. The method of claim 1, further comprising:
updating the user profile with the order;
detecting the portable control unit in proximity to a second vehicle; and
communicating a second order from the second vehicle, wherein the second order comprises information associated with the updated user profile.

30. The method of claim 1, further comprising reading the user profile from the portable control unit.

31. The method of claim 29, further comprising searching a vehicle database to identify the user profile based on detecting the portable control unit.

32. The method of claim 31, wherein searching the vehicle database comprises searching a history of prior orders associated with the user profile.

33. The method of claim 1, further comprising:
monitoring the first wireless system to identify user behavior associated with the user profile; and
storing the order on an external server.

34. The apparatus of claim 7, further comprising means for storing the stored information, wherein the means for storing is located external to the mobile control unit.

35. The apparatus of claim 7, further comprising means for storing the stored information, wherein the means for storing is located inside the mobile control unit.

36. The apparatus of claim 7, wherein the stored information comprises a user identification.

37. The apparatus of claim 7, wherein the stored information comprises a history of prior orders associated with the user.

38. The apparatus of claim 7, wherein the mobile control unit comprises a mobile phone.

39. The article of manufacture of claim 13, wherein the operations comprising storing a user profile further comprise storing prior orders made by a user.

40. The article of manufacture of claim 39, wherein the operations further comprise storing the prior orders to track user behavior.

41. The article of manufacture of claim 13, wherein the operations comprising communicating the order confirmation include communicating the order confirmation to a restaurant.

42. The article of manufacture of claim 13, wherein the operations comprising communicating the order confirmation include communicating the order confirmation to a store.

43. The article of manufacture of claim 13, wherein the operation comprising storing the user profile include storing a previous order.

44. The system of claim 19, wherein the order confirmation is transmitted to the mobile control unit via the holding device.

\* \* \* \* \*